(12) United States Patent
Kondo (10) Patent No.: US 8,490,761 B2
(45) Date of Patent: Jul. 23, 2013

(54) SUSPENSION DEVICE

(75) Inventor: Takuhiro Kondo, Tokyo (JP)

(73) Assignee: Takuhiro Kondo, Minato-ko (JP)

( * ) Notice: Subject to any disclaimer, the term of this patent is extended or adjusted under 35 U.S.C. 154(b) by 142 days.

(21) Appl. No.: 12/866,293

(22) PCT Filed: Jan. 15, 2009

(86) PCT No.: PCT/JP2009/050901
§ 371 (c)(1),
(2), (4) Date: Sep. 1, 2010

(87) PCT Pub. No.: WO2009/098942
PCT Pub. Date: Aug. 13, 2009

(65) Prior Publication Data
US 2011/0018214 A1    Jan. 27, 2011

(30) Foreign Application Priority Data

Feb. 8, 2008  (JP) .................................. 2008-028512
Feb. 8, 2008  (JP) .................................. 2008-028513

(51) Int. Cl.
*F16F 15/03* (2006.01)

(52) U.S. Cl.
USPC ..... 188/266.3; 188/266.5; 267/34; 280/5.515

(58) Field of Classification Search
USPC .......... 188/266.3, 266.5, 267, 267.1; 267/34, 267/220, 221, 226; 280/5.514, 5.515, 124.162
See application file for complete search history.

(56) References Cited

U.S. PATENT DOCUMENTS

| | | | | |
|---|---|---|---|---|
| 8,109,371 B2* | 2/2012 | Kondo et al. | ............... | 188/266.3 |
| 8,127,900 B2* | 3/2012 | Inoue | ............................. | 188/267 |
| 2009/0120745 A1* | 5/2009 | Kondo et al. | ................. | 188/267 |
| 2009/0321201 A1* | 12/2009 | Sakuta et al. | ................. | 188/290 |
| 2010/0200343 A1* | 8/2010 | Kondo et al. | ................. | 188/267 |
| 2011/0001296 A1* | 1/2011 | Kondo | ........................ | 280/5.515 |
| 2011/0101640 A1* | 5/2011 | Kondo et al. | .......... | 280/124.162 |

FOREIGN PATENT DOCUMENTS

| | | | |
|---|---|---|---|
| JP | 8197931 | | 8/1996 |
| JP | 2006-64101 | | 3/2006 |
| JP | 2007232689 | | 9/2007 |
| JP | 2007238804 | | 9/2007 |
| JP | 2008-215588 | | 9/2008 |
| JP | 2006-57815 | | 11/2008 |
| JP | 2007-292254 | | 11/2008 |
| WO | WO2007043352 | * | 4/2007 |
| WO | WO2007125624 | * | 11/2007 |

* cited by examiner

Primary Examiner — Christopher Schwartz
(74) Attorney, Agent, or Firm — McGlew and Tuttle, P.C.

(57) ABSTRACT

A suspension device (S) comprises: an actuator (A) including a motion conversion mechanism (T) for converting a linear motion to a rotational motion and a motor (M) connected to a rotary member (1) which performs the rotational motion in the motion conversion mechanism (T); a fluid pressure damper (D) connected to a linear motion member (2) which performs the linear motion in the motion conversion mechanism (T); an outer cylinder (27) connected to the actuator (A); and a bearing (34) attached to a rod (31) or a cylinder (32) connected to the linear motion member (2) of the fluid pressure damper (D) and slidably contacting with the inner circumference of the outer cylinder (27). This suspension device can improve reliability and vehicle ride quality.

20 Claims, 1 Drawing Sheet

SUSPENSION DEVICE

FIELD OF THE INVENTION

The present invention relates to an improved suspension device for suppressing relative movement between a vehicle body and an axle by an electromagnetic force generated in a motor.

DESCRIPTION OF THE RELATED ART

This kind of suspension device comprises, for example, as disclosed in Japanese Patent Application Laid-Open No. 08-197931, a suspension spring for elastically supporting the vehicle body or a sprung member of a vehicle; an actuator including a threaded shaft rotatably screwed to a ball screw nut connected to the axle or an unsprung member of the vehicle, and a motor interposed between a pair of springs while being connected to one end of the threaded shaft, and elastically supported by the sprung member; and a hydraulic damper fixed to the sprung member to damp vertical vibration of the actuator, in which the relative movement between the vehicle body and the axle is actively controlled by the thrust of the actuator.

DISCLOSURE OF THE INVENTION

In a conventional suspension device as described above, which includes a motion conversion mechanism composed of the threaded shaft and the ball screw nut to convert a torque of the motor that is a damping force generation source into a damping force to be linearly worked, when high frequency vibration is input, the high frequency vibration is absorbed by the hydraulic damper and the pair of springs, since large inertial masses of rotating members disable extension/contraction motions of the motor and the motion conversion mechanism, coupled with friction of a rotary system.

In this suspension device, however, since an annular bearing is doubly interposed between an outer cylinder which covers the motor and the motor to guide the linear motion of the motor, the presence of the bearing makes the hydraulic damper difficult to move, when absorbing the high frequency vibration by the hydraulic damper and the springs holding the motor, to hinder the vibration absorption, and can cause deterioration of vehicle ride quality resulting from transmission of the vibration to the sprung member.

Further, since the bearing interferes with vertical motion of the motor, large acceleration tends to act on the actuator, and when high frequency vibration is input, each part of the actuator is directly vibrated by this high frequency vibration. Consequently, the conventional suspension device is problematic in the point of the reliability as shock absorber, partly for the reason that high frequency vibration is large in acceleration.

In view of the above-mentioned defect of the conventional suspension device, the present invention has an object to provide a suspension device, capable of improving reliability and vehicle ride quality.

To attain the above-mentioned object, a suspension device according to the present invention comprises: an actuator including a motion conversion mechanism for converting a linear motion to a rotational motion and a motor connected to a rotary member which performs the rotational motion in the motion conversion mechanism; a fluid pressure damper connected to a linear motion member which performs the linear motion in the motion conversion mechanism; an outer cylinder connected to the actuator; and a bearing attached to a rod or a cylinder connected to the linear motion member of the fluid pressure damper and slidably contacting with the inner circumference of the outer cylinder.

According to the suspension device of the present invention, the bearing, which works as a bearing for the overall extension/contraction of the suspension device in slidable contact with the inner circumference of the outer cylinder, never presents a resistance to extension/contraction of the fluid pressure damper which absorbs high frequency vibration, since it does not move vertically or in an axial direction relative to the outer cylinder in response to extension/contraction of only the fluid pressure damper.

That is, the bearing is in slidable contact with a position which does not affect the extension/contraction of the fluid pressure damper to ensure smooth extension/contraction of the fluid pressure damper. Thus, in this suspension device, the fluid pressure damper is actively extended/contracted, upon input of high frequency vibration, to absorb the vibration, whereby the vibration isolation property to the sprung member is improved to improve the vehicle ride quality.

Further, since the bearing does not interfere with the extension/contraction of the fluid pressure damper upon input of high frequency vibration, direct action of impact force on the actuator is suppressed. Accordingly, the motor and the motion conversion mechanism can be protected to improve the reliability of the actuator that is an essential component of the suspension device, and the reliability of this suspension device can be improved by dissolving the defect of the conventional suspension device.

BEST MODE FOR CARRYING OUT THE INVENTION

Figure 1:
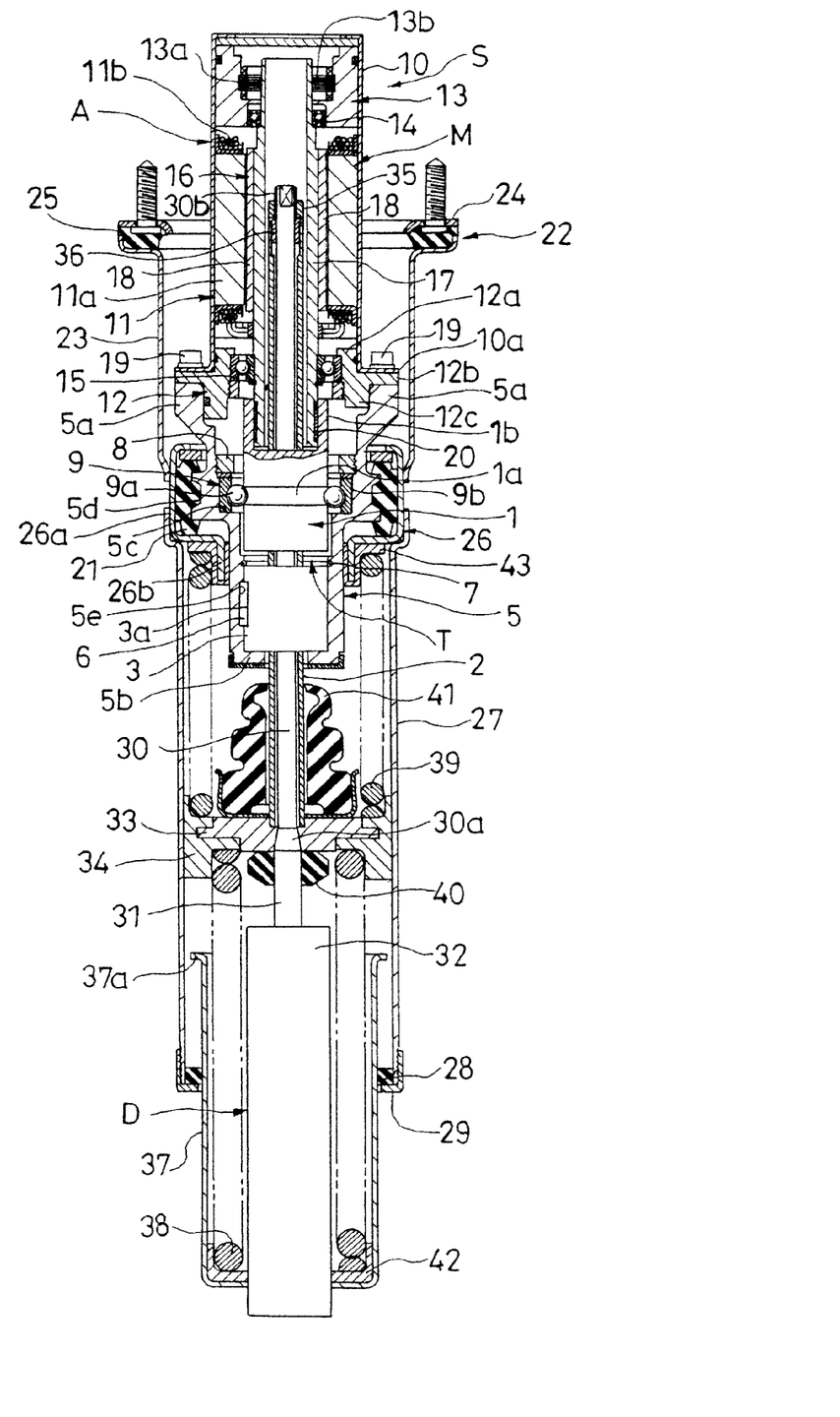
FIG. 1 is a vertical sectional view of a suspension device according to a preferred embodiment of the present invention.

A suspension device S according to one preferred embodiment of the present invention basically comprises, as shown in FIG. 1, an actuator A including a motion conversion mechanism T for converting a linear motion to a rotational motion, and a motor M connected to a ball screw nut 1 that is a rotary member which performs the rotational motion in the motion conversion mechanism T; a fluid pressure damper D connected to a threaded shaft 2 that is a linear motion member which performs the linear motion in the motion conversion mechanism T; an outer cylinder 27 connected to the actuator A; and an annular bearing 34 attached to a rod 31 connected to the threaded shaft 2 that is the linear motion member of the fluid pressure damper D and slidably contacting with the inner circumference of the outer cylinder 27.

This suspension device S can function as an actuator since the threaded shaft 2 can be linearly moved in the vertical direction in FIG. 1 by driving and rotating the ball screw nut 1 by the torque generated by the motor M.

When the threaded shaft 2 is forcedly linearly moved by an external force, a rotor R of the motor M performs rotational motion, while the motor M works to generate a torque for suppressing the rotational motion of the rotor R resulting from induction electromotive force to suppress the linear motion of the threaded shaft 2. That is, in this case, the linear motion in the vertical direction in FIG. 1 of the threaded shaft 2 that is a linear motion-side member is suppressed by a regenerative torque that the motor M generates by regeneratively converting an externally input kinematic energy into an electric energy.

That is, this suspension device S can provide a thrust to the threaded shaft 2 by causing the motor M to actively generate the torque, and also can suppress the linear motion of the threaded shaft 2, when the threaded shaft 2 is forcedly moved by external force, by the regenerative torque generated by the motor M.

Accordingly, this suspension device S can simultaneously perform, for example, attitude control of a vehicle body of a vehicle, when used by being interposed between the vehicle body and axle of the vehicle, since it not only simply generates the damping force for suppressing the linear motion of the threaded shaft 2 but also works as the actuator. Thus, this suspension device S can function also as an active suspension.

In this suspension device S, the fluid pressure damper D is serially connected to the threaded shaft 2 of the actuator A connected to the sprung member; and this fluid pressure damper D is provided mainly for the purpose of absorbing high frequency vibration. That is, the fluid pressure damper D absorbs, upon input of high frequency vibration such as a vibration with relatively large acceleration, its vibration energy by being serially connected to the actuator A large in moment of inertia which is difficult to extend/contract, in response to input of high frequency vibration, and easy to transmit the vibration.

The suspension device S can effectively perform vibration suppression, upon input of not only low frequency vibration but also high frequency vibration by running on a projection on road, to improve the vehicle ride quality.

For details, the threaded shaft 2 is formed in a cylindrical shape as shown in FIG. 1, and includes a spiral thread groove (not shown), which is formed on the outer circumference thereof; and a linear spline groove (not shown), which is formed along its axial line, namely, the linear motion direction of the threaded shaft 2. To prevent the threaded shaft 2 from dropping out of a ball spline nut 3 to be hereinafter described, the spline groove does not have to be formed at both terminal ends of the threaded shaft 2, and the number of spline groove to be provided can be optionally set.

On the other hand, the ball screw nut 1 is not shown in detail as it is well-known, but includes a spiral passage provided on the inner circumference of a cylindrical body to face the thread groove of the threaded shaft 2; a circulation path provided within the cylindrical body to communicate both ends of the above-mentioned passage with each other; a plurality of balls housed in the passage and circulation path and traveling along the thread groove; and a spacer interposed each between the balls, in which each ball can circulate in the looped passage and circulation path. Although smooth linear motion of the threaded shaft 2 is attained by using the ball screw nut 1 as a screw nut in this embodiment, a nut simply including a screw thread screwed to the thread groove of the threaded shaft 2 may be also adopted. An annular groove 1a is provided on the outer circumference of the ball screw nut 1, and a cylindrical socket 1b is provided at the upper end thereof in FIG. 1.

A locking mechanism of the threaded shaft 2 is required to linearly move the threaded shaft 2 by the rotary drive of the ball screw nut 1. In this embodiment, the locking mechanism is constituted by the spline groove provided on the outer circumference of the threaded shaft 2 and the ball spline nut 3. The ball spline nut 3 is not shown in detail since it is well-known, but includes a linear passage provided on the inner circumference of a cylindrical body to face the spline groove provided on the outer circumference of the threaded shaft 2; a circulation path provided within the cylindrical body to communicate both ends of the passage with each other; a plurality of balls housed in the passage and circulation path and traveling along the spline groove; and a spacer interposed each between the balls, in which each ball can circulate in the above-mentioned looped passage and circulation path. A key groove 3a is provided on the lateral of the ball spline nut 3.

The ball screw nut 1 is screwed to the threaded shaft 2 along the thread groove, and the ball spline nut 3 is inserted to the threaded shaft 2 along the spline groove.

Both the ball screw nut 1 and the ball spline nut 3 are retained by the inner circumference of a cylindrical holder 5 with the ball screw nut 1 being up in FIG. 1.

The holder 5 is formed in a cylindrical shape, and includes a plurality of nut parts 5a with screw hole, each provided to protrude toward the upper end outer circumference in FIG. 1; a flange 5b protruding inwardly from the lower end inner circumference in FIG. 1; a stepped part 5c provided at the middle of the inner circumference; an installation part 5d for installing a rubber vibration isolator 21, which is composed of a pair of annular projections provided at the middle of the outer circumference; and a key groove 5e provided in the inner circumference below the stepped part 5c in FIG. 1.

The ball spline nut 3 is fitted to the inner circumference of the holder 5 below the stepped part 5c, and retained in the holder 5 in a locked state by a key 6 inserted to the key groove 3a provided in the outer circumference of the ball spline nut 3 and to the key groove 5e provided in the inner circumference of the holder 5.

The ball spline nut 3 is held between a snap ring 7 attached to the inner circumference of the holder 5 and the flange part 5b of the holder 5 while abutting on the upper end in FIG. 1 of the ball spline nut 3, and is prevented from dropping out of the holder 5.

The ball screw nut 1 is rotatably retained by the holder 5 through a ball bearing 9 which is fixed to the inner circumference of the holder 5 while being held between the stepped part 5c provided on the inner circumference of the holder 5 and a nut 8 screwed to the inner circumference of the holder 5. A ball 9a of the ball bearing 9 travels along an annular groove 1a formed in the outer circumference of the ball screw nut 1, and the ball screw nut 1 can be fixed to the holder 5 by causing the ball screw nut 1 itself to work as an inner ring of the ball bearing 9, and fixing an outer ring 9b of the ball bearing 9 to the holder 5. The ball screw nut 1 and the ball spline nut 3 are arranged adjacently to each other while being retained by the holder 5.

That is, the motion conversion mechanism T composed of the ball screw nut 1 and the threaded shaft 2 is retained by the holder 5 as an assembly with the threaded shaft 2 being locked, and when the ball screw nut 1 performs rotational motion, the threaded shaft 2 is locked by the ball spline nut 3, whereby the threaded shaft 2 performs linear motion in the vertical direction in FIG. 1.

In this embodiment, since the ball screw nut 1 and the threaded shaft 2 in the motion conversion mechanism T and further the ball spline nut 3 as the locking mechanism of the threaded shaft 2 are made into an assembly, as described above, with the threaded shaft 2 and the ball screw nut 1 being axially aligned by holding these members by one holder 5, the operation of the motion conversion mechanism T is assured.

Accordingly, since the motor M is fixed to the holder 5 with the shaft 17 of the motor M being axially aligned to the threaded shaft 2 and the ball screw nut 1 by the holder 5, the thread groove of the threaded shaft 2 and the ball as the screw thread of the ball screw nut 1 are never loaded, or no radial bias load acts on the shaft 17 of the motor M. Consequently, reduction in life of the actuator A or deterioration of durability of the suspension device S is never caused.

Further, since the shaft 17 of the motor M is axially aligned to the threaded shaft 2 and the ball screw nut 1 by the holder 5, the suspension device S can be mounted on a vehicle without axial alignment operation between the threaded shaft 2 and the ball screw nut 1, and the mounting operation on the vehicle is thus remarkably facilitated, compared with the conventional suspension device.

Further, since the assembling of the actuator A is completed by making the threaded shaft 2 and the ball screw nut 1 into an assembly by the holder 5 and connecting the motor M to this assembly, the assembling process in the part of the actuator A of the suspension device S is also facilitated.

That is, the above-mentioned integral retainment of all components of the motion conversion mechanism T by the holder 5 has the following advantages: the connection of the motor M to the motion conversion mechanism T can be performed without the operation of rotating the ball screw nut 1 to pull the threaded shaft 2 into the motor M, which is required when adopting a structure such that a member which performs rotational motion of the motion conversion mechanism T or the ball screw nut 1 in this case is not retained by the holder 5 but incorporated to the motor M side, and further without consideration for locking between holders, which is required when adopting, instead of the incorporation of the ball screw nut 1 to the motor M, a structure such that the ball screw nut 1, the threaded shaft 2 and the ball spline nut 3 are retained respectively by different holders.

The above-mentioned advantages of retaining the ball screw nut 1, the threaded shaft 2 and the ball spline nut 3 by one holder 5 never precludes adoption of the structure such that the ball screw nut 1, the threaded shaft 2 and the ball spline nut 3 are retained respectively by different holders.

The length of the threaded shaft 2 located in a section between the ball screw nut 1 used to axially drive the threaded shaft 2 and the ball spline nut 3 that is a component of the locking mechanism of the threaded shaft 2 can be reduced by arranging the ball screw nut 1 and the ball spline nut 3 adjacently to each other.

The part located in the above-mentioned section of the threaded shaft 2 is to be twisted by the rotary drive of the ball screw nut 1, and the shorter the section is, the shorter the part to be twisted is.

Since the threaded shaft 2 works also as a spring element by being twisted, it takes longer time for the linear motion of the threaded shaft 2 to respond to the rotation of the ball screw nut 1 as the section to be twisted is longer. However, since the section to be twisted of the threaded shaft 2 can be reduced by arranging the ball screw nut 1 and the ball spline nut 3 adjacently to each other as described above, the responsiveness of the suspension device S, when functioning as the actuator, is improved.

The improved responsiveness of the suspension device S when functioning as the actuator leads to improved controllability when actively controlling the vehicle attitude.

On the other hand, the motor M includes, as shown in FIG. 1, a topped cylindrical casing 10; a stator 11 fixed to the inner circumference of the casing 10, the stator including a core 11a that is an armature iron core and a coil 11b wound around the core 11a; an annular cap 12 fitted to the lower end opening in FIG. 1 of the casing 10; a cylindrical sensor holder 13 housed in and fixed to the top side inner circumference of the casing 10, the holder retaining a resolver stator 13 on its inner circumference; and a rotor 16 rotatably housed in the casing 10 through a ball bearing 14 fixed to the inner circumference of the sensor holder 13 and a ball bearing 15 fixed to the inner circumference of the cap 12. The cap 12 includes a cylindrical part 12a fitted to the inner circumference of the casing 10; a collar part 12b provided on the outer circumference of the cylindrical part 12a to abut on a flange 10a provided on the lower end outer circumference in FIG. 1 of the casing 10; and a cylindrical fitting part 12c suspended from the cylindrical part 12a and fitted to the upper end inner circumference of the holder 5.

The rotor 16 includes a cylindrical shaft 17, and a magnet 18 attached to the middle outer circumference of the shaft 17 so as to face the core 11a, and the shaft 17 is rotatably housed in the casing 10 with its upper end being pivotally supported by the inner circumference of the ball bearing 14 and its lower end being pivotally supported by the inner circumference of the ball bearing 15. Although the magnet 18 is formed in an annular shape by adhering a plurality of magnets so that N-pole and S-pole are alternated along the circumference, an annular magnet having a split pole pattern in which N-pole and S-pole are alternated along the circumference can be also used.

Accordingly, various types can be used as the motor M, in addition to the structure as a brushless motor in this embodiment, and concrete examples thereof include DC motor, AC motor, induction motor, and synchronous motor.

A resolver core 13b is attached in a position facing the resolver stator 13a fixed to the inner circumference of the sensor holder 13 on the upper end outer circumference of the shaft 17 in the rotor 16, so that a rotational position of the rotor 16 can be detected by the resolver stator 13a and resolver core 13b. Thus, the motor M can be controlled based on the rotational position or rotating speed of the rotor 16 by a control device (not shown) which controls current-carrying to the coil 11b. As a means for performing position detection of the rotor 16, a magnetic sensor such as a Hall element, a rotary encoder or the like can be adopted in addition to the above-mentioned resolver.

Although it is a matter of course that the ball bearing 14 and the resolver stator 13b can be directly fixed to the casing 10 without through the sensor holder 13, the use of the sensor holder 13 offers an advantage that the ball bearing 14 and the resolver stator 13b can be fixed within the casing 10 without special processing to the casing 10.

The thus-constituted motor M is thread-fastened and mounted on the upper end in FIG. 1 of the holder 5 by a bolt 19. For details, the motor M is fixed to the upper end of the holder 5 by screwing the bolt 19 inserted through the flange 10a of the casing 10 and the collar part 12b of the cap 12 to the nut part 5a provided on the upper end outer circumference of the holder 5.

When the motor M is integrated to the holder 5, the shaft 17 of the motor M is connected to the ball screw nut 1 by inserting the lower end of the shaft 17 to the inner circumference of a socket 1b of the ball screw nut 1, so that the threaded shaft 2 can be linearly moved in the vertical direction in FIG. 1 by driving and rotating the ball screw nut 1 by the motor M. Thus, the motor M can be connected to the motion conversion mechanism T only by fixing the motor M to the holder 5 to assemble the actuator A.

A tolerance ring 20 is interposed between the outer circumference of the shaft 17 and the inner circumference of the socket 1b, and the tolerance ring 20 works as a torque limiter for regulating the upper limit of relative rotary torque around an axis which acts on the shaft 17 and the ball screw nut 1.

For details, the tolerance ring 20, which is formed in an annular shape by use of a corrugated sheet material, works as the torque limiter in the following manner. The tolerance ring 20 exhibits an energizing force, when interposed between the shaft 17 and the socket 1b, as a reaction of radial compression of corrugations formed on the sheet material, and according to the energizing force, a friction force against the relative rotation of the shaft 17 and the socket 1b is caused between the tolerance ring 20 and the shaft 17 and socket 1b, in which the shaft 17 and the ball screw nut 1 are integrated together without relative rotation until a relative torque causing the relative rotation exceeds the friction force, while the shaft 17 and the ball screw nut 1 are relatively rotated when the relative torque exceeds the maximum friction force.

In the suspension device S of this embodiment which is adapted to suppress relative vibration between a sprung member and an unsprung member of a vehicle, when an external force such that it suddenly extends/contracts the suspension device S is input, the linear motion of the threaded shaft 2 is increasingly accelerated to excessively increase the torque for rotating the ball screw nut 1, and the relative torque for relatively rotating the shaft 17 and the ball screw nut 1 exceeds a friction force resulting from the energizing force of the tolerance ring 20, causing spin of the ball screw nut 1 to the shaft 17. Then, only the ball screw nut 1 is rotated without rotation of the shaft 17, and the transmission of the torque generated in the motor M based on the moment of inertia or electromagnetic force to the ball screw nut 1 is thus suppressed.

In a situation as described above, or when the speed of stroke of the suspension device S is largely changed, accordingly, since the transmission of the torque generated in the motor M to the ball screw nut 1 is suppressed to prevent a torque more than a relative torque permitted according to the energizing force of the tolerance ring 20 from acting on the ball screw nut 1, the effect of the moment of inertia of the motor M can be reduced to prevent the generated damping force of the suspension device S from being excessive, and transmission of a sudden vibration inputted to the unsprung member to the sprung member can be consequently suppressed.

Although the tolerance ring 20 is used as the torque limiter in the above, a friction body which causes the shaft 17 and the socket 1b generate a friction force can be interposed instead. As the friction body, for example, an annular rubber or an annular plate with rough surface can be adopted.

The relative torque adjusted by the tolerance ring 20 or the friction body can be set to an experimentally or empirically-obtained value so that the effect of the moment of inertia caused when passing over a projection or groove on road can be reduced, although it can be optionally adjusted according to a control object to which the suspension device S is applied.

In the suspension device S of this embodiment, since the effect of the moment of inertia in which the generated damping force becomes excessive due to superimposition of the moment of inertia of the motor M on the torque resulting from the electromagnetic force of the motor M can be reduced, the vehicle ride quality can be improved.

In other words, the motion conversion mechanism T is immune to breakage by an effect of excessive torque since a torque exceeding an allowable relative torque does not act on the ball screw nut 1, and flying of the magnet 18 fixed around the rotor 16 can be also prevented to reduce the load on the motor M since a large angular acceleration can be prevented from acting on the rotor 16 of the motor M. Thus, the reliability of the suspension device S is improved.

Further, according to the suspension device S of this embodiment, the stroke length can be easily ensured since the tolerance ring 20 as the torque limiter is interposed to the fitting part between the cylindrical shaft 17 of the motor M and the socket 1b of the ball screw nut 1 with a minimal effect on the whole length of the suspension device S, or the torque limiter is provided in a position never affecting the stroke length.

Although the shaft 17 is connected to the ball screw nut 1 through the tolerance ring 20 in this embodiment, the ball screw nut 1 may be directly attached to the shaft 17 of the rotor 16 if it is not needed to provide the torque limiter, or the magnet 18 may be attached to the outer circumference of the ball screw nut 1 by using the ball screw nut 1 itself as a shaft in the rotor 16 of the motor M. The idea of connecting the ball screw nut 1 to the motor M in this embodiment has an intent that whether direct connection or indirect connection is regardless, and the idea includes also use of the ball screw nut 1 itself as the rotor 16. When the ball screw nut 1 is directly attached to the shaft 17 of the rotor 16, a spline or key can be used as a stopper, and a structure in which the ball screw nut 1 is fitted to the inner circumference of the shaft 17 can be also adopted.

The thus-constituted actuator A is connected to a mount 22 through the rubber vibration isolator 21 installed to the installation part 5d on the outer circumference of the holder 5. Concretely, the mount 22 includes a mount cylinder 23; an annular plate 24 connected to a sprung member (not shown) of a vehicle; and a rubber pad 25 connecting the mount cylinder 23 to the plate 24, and the lower end inner circumference in FIG. 1 of the mount cylinder 23 is joined to the outer circumference of an embracing ring 26 which embraces the outer circumference of the rubber vibration isolator 21 installed to the outer circumference of the holder 5. The embracing ring 26 includes a U-shaped sectional embracing ring body 26a which embraces the rubber vibration isolator 21, and a cylindrical socket part 26b suspended from the lower end inner circumference in FIG. 1 of the embracing ring body 26a, and a spring receiver 43 is installed to the socket part 26b.

Thus, the actuator A is connected to the sprung member of the vehicle through the mount 22 by connecting the actuator A to the mount 22.

An outer cylinder 27 is joined to the outer circumference of the embracing ring 26 for embracing the rubber vibration isolator 21, and an annular and L-shaped sectional end cap 29 is screwed to the lower end in FIG. 1 of the outer cylinder 27 to support the lower end of an annular cushion 28 fitted to the lower end inner circumference of the outer cylinder 27.

Further, in the suspension device S of this embodiment, the threaded shaft 2 is serially connected to a rod 31 of the fluid pressure damper D through a connecting shaft 30 as shown in FIG. 1. The fluid pressure damper D is not shown in detail since it is well-known, but includes a cylinder 32; a piston (not shown), which is slidably inserted into the cylinder 32 to define two pressure chambers (not shown) within the cylinder 32; a rod 31 protruded out of the cylinder 32 with one end thereof being connected to the piston; and an air chamber or reservoir (not shown), which is formed within the cylinder 32 to compensate the volume of the rod protruded to and retreated from the cylinder 32, and the fluid pressure damper D exhibits a predetermined damping force during extending/contracting operation.

The fluid pressure damper D may be of a single cylinder type provided with air chambers within the cylinder 32 or a so-called double-cylinder type provided with an annular reservoir. The adoption of the double-cylinder type as the fluid pressure damper D has an advantage that the whole length of the suspension device S can be reduced by reducing the whole length of the fluid pressure damper D. An annular cushion 40 is provided on the upper end outer circumference of the rod 31. The annular cushion 40 butts on the upper end in FIG. 1 of the cylinder 32, when the fluid pressure damper D is contracted to the maximum, to reduce the impact in the maximum contraction.

In the suspension device S of this embodiment, the connecting shaft 30 is extended from the upper end of the rod 31 of the fluid pressure damper D, and the connecting shaft 30 includes a tapered part 30a that is an engagement part to be engaged with the fluid pressure damper-side end of the threaded shaft 2, the tapered part being formed by expanding the diameter of the lower end in FIG. 1 that is a base end connected to the upper end of the rod 31; and a thread part 30b formed at the upper end in FIG. 1 that is a leading end. Although the rod 31 and the connecting shaft 30 are molded as an integrated unit in this embodiment, the rod 31 and the connecting shaft 30 may be formed as separate members, and then connected to each other. Further, although the rod 31 is connected to the threaded shaft 2 by the connecting shaft 30 in this embodiment, an inverted type can be also adopted as the fluid pressure damper D to connect the cylinder 32 to the threaded shaft 2 by the connecting shaft 30.

An annular disk 33 to be fitted to the lower end of the threaded shaft 2 is installed to the outer circumference of the tapered part 30a of the connecting shaft 30, and a bearing 34 which works as a bearing in the extending/contracting direction of the suspension device S in slidable contact with the inner circumference of the outer cylinder 27 is installed to the outer circumference of the disk 33. The shape of the bearing 34 is not limited to the one shown in the drawing as long as the bearing 34 can guide the extension/contraction of the suspension device S in slidable contact with the inner circumference of the outer cylinder 27 and also can suppress axial runout.

An annular bump cushion 41 is installed to the lower end outer circumference in FIG. 1 of the threaded shaft 2. The bump cushion 41 is restricted from moving downwardly by the disk 33, and butts on the lower end of the holder 5, when the actuator A is contracted to the maximum, to regulate the maximum contraction stroke length of the actuator A.

The maximum contraction stroke length of the suspension device S is thus regulated by the cushion 40 and the bump cushion 41, the cushion 40 regulating the maximum contraction stroke length of the fluid pressure damper D, and the bump cushion 41 regulating the maximum contraction stroke length of the actuator A.

The connecting shaft 30 is connected to the threaded shaft 2 by inserting the connecting shaft 30 into the threaded shaft 2, and screwing a nut 35 to the thread part 30b at the top end opposite to the fluid pressure damper D side. In this case, namely, the connecting shaft 30 is connected to the threaded shaft 2 by holding the threaded shaft 2 together with the disk 33 between the tapered part 30a of the connecting shaft 30 and the nut 35. The connecting shaft 30 can be accordingly connected to the threaded shaft 2 from the side opposite to the fluid pressure damper.

That is, in an assembling process for integrating the fluid pressure damper D to the actuator A, the fluid pressure damper D that is a heavy matter can be integrated to the actuator A not by connecting operation at the middle of the fluid pressure damper D and the actuator A, but only by operation from the upper side in FIG. 1 that corresponds to the side opposite to the fluid pressure damper. Therefore, the connecting operation of the fluid pressure damper D to the actuator A is facilitated, and the worker's burden can be also remarkably reduced.

The engagement of the engagement part of the connecting shaft 30, or the tapered part 30a in this case, with the fluid pressure damper-side end part of the threaded shaft 2 includes, in addition to regulation of the upward movement in FIG. 1 of the connecting shaft 30 relative to the threaded shaft 2 by direct contact of the engagement part to the fluid pressure damper-side end part of the threaded shaft 2, regulation of the upward movement in FIG. 1 of the connecting shaft 30 relative to the threaded shaft 2 by interposition of a member such as the disk 33 between the fluid pressure damper-side end part of the threaded shaft 2 and the engagement part as described above. Although the shape of the engagement part is not limited to the tapered part 30a as long as the upward movement in FIG. 1 of the connecting shaft 30 relative to the threaded shaft 2 can be regulated, the adoption of the tapered part 30a has an advantage that the fastening and centering of the disk 33 to the threaded shaft 2 are facilitated. Even if a backlash occurs between the disk 33 and the threaded shaft 2, axial slippage of the bearing 34 relative to the threaded shaft 2 can be prevented by the upward fastening in FIG. 1 by the tapered part 30a, and smooth extension/contraction of the suspension device S can be maintained.

Further, in this embodiment, a collared cylindrical spacer 36 for centering the upper end of the connecting shaft 30 relative to the threaded shaft 2 is fitted to the upper opening of the threaded shaft 2, and the inner circumference of the spacer 36 slidably contacts with the outer circumference of the connecting shaft 30 to arrest shaking in the centering of the upper end of the connecting shaft 30 to the threaded shaft 2, whereby the connecting shaft 30 is prevented from interfering with the threaded shaft 2 when vibration is input. Since the shaking of the connecting shaft 30 can be prevented by the spacer 36, the loosening of the nut 35 in the input of vibration is also suppressed.

The connecting shaft 30 is set long since it is inserted into the threaded shaft 2 and connected to the threaded shaft 2 from the side opposite to the fluid pressure damper of the threaded shaft 2 as described above. Thus, the connecting shaft 30 itself can act as a longitudinal spring element to the threaded shaft 2 which moves in the vertical direction in FIG. 1 to suppress the rupture of the shaft or the loosening of the nut 35.

Additionally, since the threaded shaft 2 and the connecting shaft 30 are detachably thread fastened in this case, only the fluid pressure damper D or only the motion conversion mechanism T of the components of the suspension device S can be easily replaced when required, and also can be disassembled to inspect only a failure point. Although the detachable connection of the threaded shaft 2 to the connecting shaft 30 facilitates the maintenance of the suspension device S and the component replacement thereof, stationary connection of the threaded shaft 2 to the connecting shaft 30 by welding, brazing or the like can be also basically adopted. This connection has no merit in the point of maintenance or component replacement, but has the same effect as the detachable connection of the threaded shaft 2 to the connecting shaft 30 in the point of facilitating the assembling of the fluid pressure damper D to the actuator A. That is, the connection of the threaded shaft 2 to the connecting shaft 30 includes not only the detachable connection but also fixation without schedule of detachment. The detachable connection can be performed by a method other than the thread fastening.

In order to facilitate the connecting operation for integrating the fluid pressure damper D to the actuator A in the suspension device S, the threaded shaft 2 is made into a cylindrical shape in the above to allow the connection of the connecting shaft 30 from the side opposite to the fluid pressure damper of the threaded shaft 2. However, the threaded shaft 2 may not be made into a cylindrical shape, and be directly connected to the rod 31 or cylinder 32 of the fluid pressure damper D at the middle of the fluid pressure damper D and the actuator A.

A cover cylinder 37 is provided on the lateral outer circumference of the cylinder 32 of the fluid pressure damper D to cover the cylinder 32 while forming an annular clearance from the cylinder 32, and the upper end of the cover cylinder 37 is folded to form a collar part 37a.

The collar part 37a of the cover cylinder 37 butts on a cushion 28 fitted to the lower end inner circumference in FIG. 1 of the outer cylinder 27 when the suspension device S is extended to the maximum, and the cushion 28 regulates the overall full extension of the suspension device S.

Since the fluid pressure damper D and the actuator A independently extend and contract, the overall maximum extension stroke length of the suspension device S reaches the total of maximum extension stroke lengths of the fluid pressure damper D and the actuator A without such regulation. Therefore, the overall maximum extension stroke length of the suspension device S is regulated by the collar part 37a and the cushion 28.

An annular spring receiver 42 is placed on the bottom of the cover cylinder 37 and housed in the lower end inner circumference of the cover cylinder 37. A spring 38 to be juxtaposed to the fluid pressure damper D is interposed between the spring receiver 42 and the lower end of the bearing 34, and a spring 39 to be juxtaposed to the actuator A is interposed between the spring receiver 43 installed to the socket part 26b of the embracing ring 26 and the upper end of the bearing 34. These springs 38 and 39 work as a suspension spring for supporting the weight of the sprung member of the vehicle, and also exhibit the function of positioning the rod 31 of the fluid pressure damper D to a neutral position relative to the cylinder 32, in which the spring 38 is juxtaposed to the fluid pressure damper D to energize the fluid pressure damper D in the extending direction, and the spring 39 is juxtaposed to the actuator A to energize the fluid pressure damper D in the contracting direction.

Since the upper ends of the springs 38 and 39 are supported by the embracing ring 26 connected to the mount 22, while the actuator A is elastically supported through the rubber vibration isolator 21 by the mount 22, vibration of the springs 38 and 39 as the suspension spring is not directly transmitted to the actuator A, and the vibration isolation to the suspension spring can be ensured.

The springs 38 and 39 also work to suppress transmission of vibration of the unsprung member of the vehicle toward the motor M side or to the sprung member, and also exert the effect of returning the rod 31 to the neutral position relative to the cylinder 32 of the fluid pressure damper D. Since the rod 31 is returned to the neutral position relative to the cylinder 32 by the springs 38 and 39 when the vibration of the suspension device S is converged, the piston can be prevented from being left as it is located in the vicinity of the upper end or lower end to the cylinder 32, and deterioration of vehicle ride quality or deterioration of reliability of the suspension device S resulting from interference of the piston with the upper end or lower end of the cylinder 32 in subsequent input of vibration is never caused.

The neutral position referred to herein means a position where the rod 31 is positioned relative to the cylinder 32 in a state where the sprung member in the vehicle is supported by each spring 38, 39, but does not mean only a rod position where the piston connected to the end of the rod 31 is located at the center of the cylinder 32.

In this case, since the function of positioning the rod 31 of the fluid pressure damper D to the neutral position can be consolidated to the springs 38 and 39 as the suspension spring, it is not necessary to separately provide a spring which performs only the positioning function to the neutral position or performs only the suspension spring function, and the number of part items and the cost in the suspension device S can be reduced, However, when the springs 38 and 39 are abolished, and the positioning and returning of the rod 31 to the neutral position relative to the cylinder 31 is performed by use of a suspension spring housed within each pressure chamber in the fluid pressure damper D or the like, the suspension spring may be separately provided, and the suspension spring may be interposed indirectly between the mount 22 and the unsprung member by supporting the upper end of the suspension spring not only by the mount 22 but also by the sprung member.

The positioning and returning of the rod 31 to the neutral position relative to the cylinder 32 may be performed by a means other than the springs 38 and 39, for example, by folding the upper end of the cover cylinder 37 inwardly so that a pair of cylinder-side spring receivers immobile in the axial direction of the cylinder 32 is provided on the outer circumference of the cylinder 32 by the annular bottom of the cover cylinder 37 and the inwardly folded part at the upper end, disposing a rod-side spring receiver to be connected to the rod 31 between the cylinder-side spring receivers, and interposing each spring which energizes in the extending/contracting direction of the fluid pressure damper D each between the cylinder-side spring receivers and the rod-side spring receiver, or in two positions.

In this suspension device S, when high frequency vibration such as a vibration with relatively large acceleration, for example, is input to the unsprung member in a case such that the vehicle travels along a bad road or runs on a projection on road, the fluid pressure damper D works to absorb this vibration energy so that the vibration is hardly transmitted to the threaded shaft 2 side, coupled with the vibration transmission suppressing effect by the springs 38 and 39, since it is serially connected to the threaded shaft 2 which is linearly moved by the motor M.

The suspension device S adapted to convert a vibration inputted from the unsprung member that is a linear motion into a rotational motion includes many rotating members, and has properties such that it tends to transmit the vibration of the unsprung member to the sprung member because the moment of inertia to high frequency vibration is large due to large inertial masses of the rotating members, coupled with the effect of friction between the bearing 34 and the outer cylinder 27. However, as described above, the fluid pressure damper D absorbs the vibration, and further the springs 38 and 39 exhibit the vibration transmission suppressing effect, whereby the transmission of the vibration to the threaded shaft 2 is suppressed. Therefore, the transmission of the vibration to the sprung member can be effectively suppressed.

In this suspension device S, further, the bearing 34, which works as the bearing for the overall extension/contraction of the suspension device S in slidable contact with the inner circumference of the outer cylinder 27, never presents a resistance to the extension/contraction of the fluid pressure damper D which absorbs high frequency vibration, since it does not move in the vertical direction in FIG. 1 that is the axial direction relative to the outer cylinder 27 in response to extension/contraction of only the fluid pressure damper D.

That is, the bearing 34 is in slidable contact with a position which does not affect the extension/contraction of the fluid pressure damper D to ensure smooth extension/contraction of the fluid pressure damper D. Thus, in this suspension device S, the fluid pressure damper D is actively extended/contracted, upon input of high frequency vibration, to absorb the vibration, whereby the vibration isolation property to the sprung member is improved to improve the vehicle ride quality.

Further, since the bearing 34 does not interfere with the extension/contraction of the fluid pressure damper D upon input of high frequency vibration, direct action of impact force on the actuator A is suppressed. Accordingly, the motor M and the motion conversion mechanism T can be protected to improve the reliability of the actuator A that is an essential component of the suspension device S, and the reliability of the suspension device S can be improved by dissolving the defect of the conventional suspension device.

In this case, since the bearing 34 is interposed between the spring 38 juxtaposed to the fluid pressure damper D and the spring 39 juxtaposed to the actuator A to work also as a spring receiver of each spring 38, 39, a separate member which works only as the spring receiver can be dispensed with, and the number of part items in the suspension device S can be largely reduced to reduce the cost, coupled with the reduction in the number of part items by the springs 38 and 39 which work as the suspension spring and also as the positioning for positioning the fluid pressure damper D to the neutral position. Further, the protection of the suspension spring can be also attained since the springs 38 and 39 are disposed within the outer cylinder 27.

When the suspension spring is provided on the outer circumferential side of the outer cylinder 27, the bearing 34 loses the function as the spring receiver of the springs 38 and 39, but can maintain the effect of improving the vehicle ride quality since the bearing 34 does not move in the vertical direction in FIG. 1 that is the axial direction relative to the outer cylinder 27 in response to extension/contraction of only the fluid pressure damper D which absorbs high frequency vibration. Further, although the bearing 34 is attached to the rod 31 in this embodiment since it is the rod 31 of the fluid pressure damper D that is connected to the threaded shaft 2 as the linear motion member, the bearing 34 can be attached to the cylinder 32 when the cylinder 32 is connected to the linear motion member of the actuator A. Even in such a case, the above-mentioned function effect is never lost since the bearing 34 does not interfere with the extension/contraction of the fluid pressure damper D.

In the suspension device S of this embodiment, since the actuator A is elastically supported by the mount 22 connected to the sprung member through the rubber vibration isolator 21, the vibration of the actuator A with large inertial weight can be prevented from being directly transmitted to the sprung member, and since the actuator A is vibration-isolated from the springs 38 and 39 as the suspension spring due to the presence of the rubber vibration isolator 21, excitation of the sprung member by the inertia of the actuator A vibrating in the middle between the sprung member and the unsprung member can be also suppressed.

Further, by adopting the above-mentioned structure in which the actuator A is elastically supported while being isolated from the springs 38 and 39 as the suspension spring, even in a situation such that high frequency vibration cannot be sufficiently absorbed by the fluid pressure damper D, and the actuator A difficult to extend/contract in response to input of high frequency vibration as described above reaches a so-called bar-like state, this vibration can be absorbed by the rubber vibration isolator 21 to break the transmission of the vibration to the sprung member.

That is, the vehicle ride quality can be improved by adopting the above-mentioned structure of elastically supporting the actuator A while isolating it from the springs 38 and 39 as the suspension spring.

Further, since direct action of high frequency vibration on the actuator A disposed on the sprung member side is prevented by the fluid pressure damper D disposed on the unsprung member side, transmission of high frequency vibration with particularly large acceleration to the motor M is suppressed, and the reliability of the actuator A that is an essential component of the suspension device S is improved by disposing the actuator A on the sprung member side in addition to by the effect of the bearing 34. Thus, the reliability of the suspension device S can be improved by dissolving the defect of the conventional suspension device.

Since the actuator A and the fluid pressure damper D are housed in the outer cylinder 27, the cover cylinder 37 and the mount 22 to isolate the essential drive part of the suspension device S from the outside of the suspension device S in the suspension device S, penetration of rainwater into the suspension device S and contact of flying stones to the essential drive part can be surely prevented. Accordingly, the practicability of the suspension device S is improved.

When the thus-constituted suspension device S is actually assembled, the motion conversion mechanism T and the fluid pressure damper D can be integrated by inserting the connecting shaft 30 connected to the rod 31 of the fluid pressure damper D into the disk 33 installed with the bearing 34 and the threaded shaft 2 of the assembly which is composed of only the motion conversion mechanism T retained by the holder 5, and screwing the nut 35 to the thread part 30b at the upper end of the connecting shaft 30 from the upper end side in FIG. 1, and the motor M is thereafter mounted on the upper end of the holder 5, whereby the assembling of the suspension device S is completed.

Since the motor M includes the cylindrical shaft 17 so as to insert the threaded shaft 2 into the shaft 17, the shaft 17 of the motor M can be connected to the ball screw nut 1 in the motion conversion mechanism T from the side opposite to the fluid pressure damper after integrating the motion conversion mechanism T to the fluid pressure damper D, and the assembling process of the suspension device S is further facilitated.

Although the motion conversion mechanism T includes the ball screw nut 1 which performs rotational motion and the threaded shaft 2 that is a linear motion member which performs linear motion in this case, the ball screw nut 1 may be conversely connected to the fluid pressure damper D while taking the threaded shaft 2 as the rotary member and the ball screw nut 1 as the linear motion member. Although the motion conversion mechanism T is a feed screw mechanism composed of the threaded shaft 2 and the ball screw nut 1 in this embodiment, it may be composed of a mechanism such as a rack-and-pinion, a worm gear or the like.

In this embodiment, the ball spline nut 3 to be engaged with the spline groove provided in the outer circumference of the threaded shaft 2 is adopted as the locking mechanism since smooth vertical movement of the threaded shaft 2 can be ensured. Otherwise, the locking mechanism can be retained by the holder 5 by simply forming a groove in the outer circumference of the threaded shaft 2 along its axial line, and fitting a member which does not inhibit the vertical movement of the threaded shaft 2 such as a key to the groove to lock the threaded shaft 2.

The scope of the present invention is never limited to those shown or described in detail herein.

Industrial Applicability

The suspension device of the present invention can be used for a vehicular suspension.

The invention claimed is:
1. A suspension device, comprising:
an actuator including a motion conversion mechanism for converting a linear motion to a rotational motion and a motor connected to a rotary member which performs the rotational motion in the motion conversion mechanism;
a fluid pressure damper connected to a linear motion member which performs the linear motion in the motion conversion mechanism, said fluid pressure damper comprising a fluid pressure damper cylinder;
an outer cylinder connected to the actuator; and
a bearing attached to a rod or said pressure damper cylinder connected to the linear motion member of the fluid pressure damper, said bearing slidably contacting with an inner circumference of the outer cylinder, wherein a suspension spring is constituted by a spring juxtaposed to the fluid pressure damper and a spring juxtaposed to the actuator, and the bearing is interposed between the springs to serve also as a spring receiver.

2. A suspension device according to claim 1, further comprising:
a holder rotatably retaining said screw nut and said holder retaining a locking mechanism for blocking rotation of said threaded shaft, said motor being fixed to said holder, wherein the rotary member in the motion conversion mechanism is a screw nut, the linear motion member is a threaded shaft to be screwed to the screw nut, a holder which rotatably retains the screw nut and also retains a locking mechanism for blocking rotation of the threaded shaft is provided, and the motor is fixed to the holder, said fluid pressure damper comprising a fluid pressure damper cylinder, a piston slidably inserted into said fluid pressure damper cylinder and a rod extending out of said fluid pressure damper cylinder with one end of said rod being connected to said piston, said rotary member being a screw nut, said linear motion member being a threaded shaft to be screwed into said screw nut.

3. A suspension device according to claim 2, wherein the motor is provided with a cylindrical shaft, and the threaded shaft is inserted into the shaft.

4. A suspension device according to claim 3, wherein a cylindrical socket for inserting the shaft of the motor is provided at one end of the screw nut, and a friction body is interposed between the inner circumference of the socket and the outer circumference of the shaft.

5. A suspension device according to claim 2, wherein a cylindrical socket for inserting the shaft of the motor is provided at one end of the screw nut, and a friction body is interposed between the inner circumference of the socket and the outer circumference of the shaft.

6. A suspension device according to claim 2, wherein the friction body is a tolerance ring.

7. A suspension device according to claim 1, wherein the rotary member in the motion conversion mechanism is a screw nut, the linear motion member is a threaded shaft to be screwed to the screw nut, a holder which rotatably retains the screw nut and also retains a locking mechanism for blocking rotation of the threaded shaft is provided, and the motor is fixed to the holder.

8. A suspension device, comprising:
an actuator including a screw nut, a threaded shaft connected to said screw nut, a motor connected to said screw nut and a motion conversion means for converting a linear motion of said threaded shaft to a rotational motion;
a fluid pressure damper;
a rod connected to said fluid pressure damper, said rod being connected to said threaded shaft;
an outer cylinder connected to the actuator;
a bearing connected to said rod, said bearing being in sliding contact with an inner circumference of said outer cylinder, wherein said bearing engages said inner circumference of said outer cylinder;
a suspension spring comprising a spring juxtaposed to the fluid pressure damper and a spring juxtaposed to the actuator, said bearing being interposed between the springs to serve also as a spring receiver.

9. A suspension device according to claim 8, wherein the motor is provided with a cylindrical shaft, and the threaded shaft is inserted into the shaft.

10. A suspension device according to claim 9, wherein a cylindrical socket for inserting the shaft of the motor is provided at one end of the screw nut, and a friction body is interposed between the inner circumference of the socket and the outer circumference of the shaft.

11. A suspension device in accordance with claim 8, further comprising:
a locking mechanism;
a holder, said screw nut being arranged in an interior of said holder, wherein said screw nut is rotatable with respect to said holder, said locking mechanism being arranged in the interior of said holder, wherein said threaded shaft is fixed via at least said locking mechanism such that said threaded shaft is non-rotatable with respect to said holder, wherein said motor is fixed to said holder, said fluid pressure damper comprising a fluid pressure damper cylinder, a piston slidably inserted into said fluid pressure damper cylinder, said rod extending out of said fluid pressure damper cylinder, wherein one end of said rod is connected to said piston.

12. A suspension device according to claim 8, wherein a cylindrical socket for inserting the shaft of the motor is provided at one end of the screw nut, and a friction body is interposed between the inner circumference of the socket and an outer circumference of the shaft.

13. A suspension device according to claim 12, wherein the friction body is a tolerance ring.

14. A suspension device, comprising:
a screw nut;
a threaded shaft connected to said screw nut;
an actuator including a motion conversion means for converting a linear motion of said threaded shaft to a rotational motion and a motor connected to said screw nut;
a fluid pressure damper;
a rod connected to said fluid pressure damper, said rod being connected to said threaded shaft;
an outer cylinder connected to the actuator;
a bearing connected to said rod, said bearing being in sliding contact with an inner circumference of said outer cylinder, wherein said bearing is in contact with said inner circumference of said outer cylinder and said bearing remains in contact with said inner circumference of said outer cylinder over a course of movement of said bearing;
a holder comprising a holder interior space, said screw nut movably mounted in said holder interior space such that said screw nut is rotatable with respect to said holder, said threaded shaft being non-rotatable with respect to said holder.

15. A suspension device in accordance with claim 14, further comprising:
a locking mechanism arranged in said holder interior space, said locking mechanism cooperating with said holder to fix said threaded shaft such that said threaded shaft is non-rotatable with respect to said holder.

16. A suspension device in accordance with claim 15, wherein said motor is fixed to said holder.

17. A suspension device in accordance with claim 16, wherein said fluid pressure damper comprises a fluid pressure damper cylinder, a piston slidably inserted into said fluid pressure damper cylinder, said rod extending out of said fluid pressure damper cylinder, wherein one end of said rod is connected to said piston.

18. A suspension device according to claim 17, further comprising:
a suspension spring comprising a spring juxtaposed to the fluid pressure damper and a spring juxtaposed to the actuator, wherein the bearing is interposed between the springs to serve also as a spring receiver.

19. A suspension device according to claim 14, wherein the motor is provided with a cylindrical shaft, and the threaded shaft is inserted into the shaft, wherein a cylindrical socket for inserting the shaft of the motor is provided at one end of the screw nut, and a friction body is interposed between an inner circumference of the socket and an outer circumference of the shaft.

20. A suspension device according to claim 19, wherein said friction body is a tolerance ring.

\* \* \* \* \*

UNITED STATES PATENT AND TRADEMARK OFFICE
CERTIFICATE OF CORRECTION

PATENT NO. : 8,490,761 B2
APPLICATION NO. : 12/866293
DATED : July 23, 2013
INVENTOR(S) : Takuhiro Kondo Page 1 of 1

It is certified that error appears in the above-identified patent and that said Letters Patent is hereby corrected as shown below:

On the Title Page

Please correct the Assignee information to --Kayaba Industry Co., LTD.--

Signed and Sealed this
Nineteenth Day of November, 2013

Teresa Stanek Rea
*Deputy Director of the United States Patent and Trademark Office*